US008316903B2

(12) United States Patent
Majumdar et al.

(10) Patent No.: US 8,316,903 B2
(45) Date of Patent: Nov. 27, 2012

(54) PNEUMATIC TIRE HAVING BUILT-IN SEALANT LAYER AND PREPARATION THEREOF

(75) Inventors: Ramendra Nath Majumdar, Hudson, OH (US); Aaron Scott Puhala, Kent, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1213 days.

(21) Appl. No.: 11/865,167

(22) Filed: Oct. 1, 2007

(65) Prior Publication Data

US 2009/0084483 A1    Apr. 2, 2009

(51) Int. Cl.
*B60C 19/12* (2006.01)
*B29C 73/22* (2006.01)

(52) U.S. Cl. .......... 152/503; 152/502; 152/504; 156/87; 156/115

(58) Field of Classification Search ............. 156/115, 156/87, 97, 123, 133; 152/502, 503–505, 152/510; 523/166; 106/33
See application file for complete search history.

(56) References Cited

U.S. PATENT DOCUMENTS

| | | |
|---|---|---|
| 452,876 A | 5/1891 | Gray |
| 509,904 A | 12/1893 | Holt |
| 541,075 A | 6/1895 | Davids |
| 587,211 A | 7/1897 | Jones et al. |
| 1,217,888 A | 2/1917 | Wildman et al. |
| 1,239,291 A | 9/1917 | Morse et al. |
| 1,444,706 A | 2/1923 | Rosete |
| 2,062,638 A | 12/1936 | Campbell |
| 2,194,341 A | 3/1940 | Voorhees |
| 2,342,580 A | 2/1944 | Hartz |
| 2,523,695 A | 9/1950 | Greene |
| 2,566,384 A | 9/1951 | Tilton, Jr. |
| 2,699,811 A | 12/1951 | Trautman |
| 2,587,470 A | 2/1952 | Herzegh |
| 2,910,106 A | 9/1953 | Keefe |
| 2,712,847 A | 7/1955 | Harris |

(Continued)

FOREIGN PATENT DOCUMENTS

EP    1174290 A1    1/2002

(Continued)

OTHER PUBLICATIONS

English language abstract for JP 53-114882.*

(Continued)

*Primary Examiner* — Christina Johnson
*Assistant Examiner* — Martin Rogers
(74) *Attorney, Agent, or Firm* — Wood, Herron & Evans, LLP (57) ABSTRACT

The present invention is directed to a pneumatic tire having a built-in sealant layer and its preparation. In one embodiment, the pneumatic tire includes an outer circumferential rubber tread and a supporting carcass. An optional rubber inner liner is disposed inwardly from the supporting carcass. A built-in sealant layer is disposed inwardly from the rubber inner liner. The built-in sealant layer provides self-sealing properties to the pneumatic tire. A gas permeable layer is situated adjacent an innermost rubber inner liner and the built-in sealant layer. The innermost rubber inner liner has a plurality of spaced apart openings extending therethrough, which are covered by the gas permeable layer. The tire, with its innermost inner liner with holes and the gas permeable layer, allows for elimination or reduction in blister formation in the tire by permitting gas from the built-in sealant layer to escape.

9 Claims, 1 Drawing Sheet

U.S. PATENT DOCUMENTS

| | | | |
|---|---|---|---|
| 2,752,978 A | 7/1956 | Kindle et al. | |
| 2,752,979 A | 7/1956 | Knill et al. | |
| 2,756,801 A | 7/1956 | Iknayan et al. | |
| 2,776,699 A | 1/1957 | Kindle et al. | |
| 2,782,829 A | 2/1957 | Peterson et al. | |
| 2,802,505 A | 8/1957 | Peterson et al. | |
| 2,811,190 A | 10/1957 | Iknayan et al. | |
| 2,818,902 A | 1/1958 | Schutz | |
| 2,827,098 A | 3/1958 | Semegen et al. | |
| 2,877,819 A | 3/1959 | Gibbs | |
| 2,905,220 A | 9/1959 | Schutz | |
| 2,935,109 A | 5/1960 | Railsback | |
| 2,953,184 A | 9/1960 | Erstad | |
| 3,048,509 A | 8/1962 | Sweet et al. | |
| 3,361,698 A | 1/1968 | Pace | |
| 3,449,155 A | 6/1969 | Fuller | |
| 3,563,294 A | 2/1971 | Chien | |
| 3,563,295 A * | 2/1971 | Hough | 152/451 |
| 3,628,585 A | 12/1971 | Pace | |
| 3,747,660 A | 7/1973 | Tibbals | |
| 3,860,539 A | 1/1975 | Miyazata | |
| 3,881,537 A | 5/1975 | Miyazato | |
| 3,881,943 A | 5/1975 | Fuller et al. | |
| 3,903,947 A | 9/1975 | Emerson | |
| 3,920,061 A | 11/1975 | Japp et al. | |
| 3,930,528 A * | 1/1976 | Harrington | 152/521 |
| 3,931,843 A | 1/1976 | Edwards et al. | |
| 3,935,893 A * | 2/1976 | Stang et al. | 152/504 |
| 3,938,573 A | 2/1976 | Hallenbeck | |
| 3,942,573 A | 3/1976 | Lawrence et al. | |
| 3,952,787 A | 4/1976 | Okado et al. | |
| 3,981,342 A | 9/1976 | Farber et al. | |
| 4,027,712 A | 6/1977 | Verdier | |
| 4,032,500 A | 6/1977 | Koch et al. | |
| 4,037,636 A | 7/1977 | Hagenbohmer et al. | |
| 4,057,090 A | 11/1977 | Hoshikawa et al. | |
| 4,064,922 A | 12/1977 | Farber et al. | |
| 4,068,027 A | 1/1978 | Van Ornum | |
| 4,090,546 A | 5/1978 | Honda et al. | |
| 4,094,353 A | 6/1978 | Ford | |
| 4,096,898 A | 6/1978 | Messerly et al. | |
| 4,101,494 A | 7/1978 | Kent et al. | |
| 4,109,695 A | 8/1978 | Miyazato | |
| 4,113,799 A | 9/1978 | Van Ornum et al. | |
| 4,115,172 A | 9/1978 | Baboff et al. | |
| 4,116,895 A | 9/1978 | Kageyama et al. | |
| 4,117,036 A | 9/1978 | Honda et al. | |
| 4,120,337 A | 10/1978 | Soma et al. | |
| 4,140,167 A | 2/1979 | Bohm et al. | |
| 4,148,348 A | 4/1979 | French et al. | |
| 4,149,579 A | 4/1979 | Senger | |
| 4,153,095 A | 5/1979 | Sarkissian | |
| 4,156,768 A | 5/1979 | Cook | |
| 4,161,202 A | 7/1979 | Powell et al. | |
| 4,163,207 A | 7/1979 | Dodd | |
| 4,171,237 A | 10/1979 | Bohm et al. | |
| 4,183,390 A | 1/1980 | Hallman | |
| 4,186,042 A | 1/1980 | Powell et al. | |
| 4,206,008 A | 6/1980 | Tacke et al. | |
| 4,206,796 A | 6/1980 | Chemizard | |
| 4,210,187 A | 7/1980 | Egan | |
| 4,213,491 A | 7/1980 | Pope et al. | |
| 4,214,619 A | 7/1980 | Bowerman, Jr. et al. | |
| 4,216,812 A | 8/1980 | Bourne | |
| 4,217,395 A | 8/1980 | Kuan et al. | |
| 4,224,208 A | 9/1980 | Kent | |
| 4,228,839 A | 10/1980 | Bohm et al. | |
| 4,252,377 A | 2/1981 | Muhammad | |
| 4,258,771 A | 3/1981 | Snyder | |
| 4,259,401 A | 3/1981 | Chahroudi et al. | |
| 4,262,624 A | 4/1981 | Soeda et al. | |
| 4,262,724 A | 4/1981 | Sarkissian | |
| 4,263,075 A | 4/1981 | Bowerman, Jr. et al. | |
| 4,274,466 A | 6/1981 | French et al. | |
| 4,276,898 A | 7/1981 | Ross | |
| 4,279,343 A | 7/1981 | Alfanta | |
| 4,281,621 A | 8/1981 | Tacke et al. | |
| 4,284,742 A | 8/1981 | Bowerman, Jr. et al. | |
| 4,286,643 A | 9/1981 | Chemizard et al. | |
| 4,287,928 A | 9/1981 | Hallman | |
| 4,289,089 A | 9/1981 | Tacke et al. | |
| 4,289,805 A | 9/1981 | Dubow | |
| 4,294,730 A | 10/1981 | Kenney | |
| 4,300,614 A | 11/1981 | Kageyama et al. | |
| 4,304,281 A | 12/1981 | Kenney | |
| 4,317,692 A | 3/1982 | Niconchuk | |
| 4,328,053 A * | 5/1982 | Medlin, Jr. | 156/96 |
| 4,340,104 A | 7/1982 | Kuan | |
| 4,351,382 A | 9/1982 | Corner et al. | |
| 4,356,214 A | 10/1982 | Soeda et al. | |
| 4,359,078 A | 11/1982 | Egan | |
| 4,388,261 A | 6/1983 | Codispoti et al. | |
| 4,391,317 A | 7/1983 | Savage | |
| 4,396,053 A | 8/1983 | Davis et al. | |
| 4,398,492 A | 8/1983 | Casey | |
| 4,398,583 A | 8/1983 | Casey | |
| 4,418,093 A | 11/1983 | Gomberg et al. | |
| 4,424,295 A | 1/1984 | Van Ornum et al. | |
| 4,426,468 A | 1/1984 | Ornum et al. | |
| 4,433,011 A | 2/1984 | Larson et al. | |
| 4,434,832 A | 3/1984 | Koch et al. | |
| 4,436,857 A | 3/1984 | Kuan et al. | |
| 4,443,279 A | 4/1984 | Sandstrom | |
| 4,444,294 A | 4/1984 | Yoshigai | |
| 4,445,562 A | 5/1984 | Bohm et al. | |
| 4,453,992 A | 6/1984 | Kuan et al. | |
| 4,455,011 A | 6/1984 | Levine | |
| 4,473,948 A | 10/1984 | Chadwick | |
| 4,501,825 A | 2/1985 | Magyar et al. | |
| 4,528,331 A | 7/1985 | Bohm et al. | |
| 4,539,344 A | 9/1985 | Van Ornum et al. | |
| 4,548,687 A | 10/1985 | Kitamura et al. | |
| 4,588,758 A | 5/1986 | Jaspon | |
| 4,607,065 A | 8/1986 | Kitamura et al. | |
| 4,607,675 A | 8/1986 | Patitsas et al. | |
| 4,616,048 A | 10/1986 | De Trano et al. | |
| 4,634,488 A * | 1/1987 | Tournier | 156/285 |
| 4,652,243 A | 3/1987 | Crosslen | |
| 4,658,876 A | 4/1987 | Augier | |
| 4,659,589 A | 4/1987 | Jimenez | |
| 4,664,168 A | 5/1987 | Hong et al. | |
| 4,665,963 A * | 5/1987 | Timar et al. | 152/504 |
| 4,678,375 A | 7/1987 | Gagle et al. | |
| 4,713,114 A | 12/1987 | Smith | |
| 4,739,724 A | 4/1988 | Giordano | |
| 4,743,468 A | 5/1988 | Jimenez | |
| 4,743,497 A | 5/1988 | Thorsrud | |
| 4,744,843 A * | 5/1988 | Lewis | 156/87 |
| 4,746,544 A | 5/1988 | Hogen-Esch | |
| 4,749,730 A | 6/1988 | Jimenez | |
| 4,765,367 A | 8/1988 | Scott | |
| 4,776,888 A | 10/1988 | Morrow | |
| 4,816,101 A | 3/1989 | Hong et al. | |
| 4,895,610 A | 1/1990 | Egan | |
| 4,899,826 A | 2/1990 | Penn | |
| 4,913,209 A | 4/1990 | Hong et al. | |
| 4,918,976 A | 4/1990 | Fogal et al. | |
| 4,919,183 A | 4/1990 | Dodson | |
| 4,928,741 A | 5/1990 | Rye et al. | |
| 4,934,426 A * | 6/1990 | Remond et al. | 152/209.17 |
| 4,957,573 A | 9/1990 | Gomberg | |
| 4,958,587 A | 9/1990 | Fogal, Sr. et al. | |
| 4,966,213 A | 10/1990 | Kawaguchi et al. | |
| 4,970,242 A | 11/1990 | Lehman | |
| 5,053,089 A | 10/1991 | Ristich | |
| 5,053,259 A | 10/1991 | Vicik | |
| 5,059,636 A | 10/1991 | Grenga | |
| 5,070,917 A | 12/1991 | Ferris et al. | |
| 5,085,942 A * | 2/1992 | Hong et al. | 428/492 |
| 5,099,900 A | 3/1992 | Gomberg | |
| 5,110,629 A | 5/1992 | Gomberg et al. | |
| 5,116,449 A | 5/1992 | Fabris et al. | |
| 5,124,395 A | 6/1992 | Abramowski et al. | |
| 5,128,392 A | 7/1992 | DeTrano et al. | |
| 5,178,701 A | 1/1993 | Taylor | |
| 5,226,958 A | 7/1993 | Bowman et al. | |
| 5,231,872 A | 8/1993 | Bowler et al. | |

| | | |
|---|---|---|
| 5,267,662 A | 12/1993 | Hayes |
| 5,284,895 A | 2/1994 | Gupta |
| 5,295,525 A | 3/1994 | Sanda, Jr. |
| 5,335,540 A | 8/1994 | Bowler et al. |
| 5,338,776 A | 8/1994 | Peelor et al. |
| 5,344,679 A | 9/1994 | Vicik |
| 5,364,463 A | 11/1994 | Hull |
| 5,365,779 A | 11/1994 | Vander Velde |
| 5,385,191 A | 1/1995 | Aflague et al. |
| 5,385,980 A | 1/1995 | Schaefer et al. |
| 5,403,417 A | 4/1995 | Dudley et al. |
| 5,435,363 A | 7/1995 | Pender |
| 5,460,033 A | 10/1995 | Vander Velde |
| 5,466,049 A | 11/1995 | Harmsen |
| 5,480,945 A | 1/1996 | Vicik |
| 5,500,456 A | 3/1996 | Hughett et al. |
| 5,527,409 A | 6/1996 | Lanphier |
| 5,618,912 A | 4/1997 | Fang |
| 5,648,406 A | 7/1997 | Peelor et al. |
| 5,705,604 A | 1/1998 | Fang |
| 5,755,863 A | 5/1998 | Morrow |
| 5,765,601 A | 6/1998 | Wells et al. |
| 5,772,747 A | 6/1998 | Turner et al. |
| 5,800,643 A | 9/1998 | Frankowski |
| 5,834,534 A | 11/1998 | Adams et al. |
| 5,840,274 A | 11/1998 | Bishop |
| 5,846,620 A | 12/1998 | Compton |
| 5,855,972 A | 1/1999 | Kaeding |
| 5,856,376 A | 1/1999 | Wong |
| 5,908,145 A | 6/1999 | Jaksa |
| 5,909,752 A | 6/1999 | Gerresheim et al. |
| 5,916,931 A | 6/1999 | Adams et al. |
| 5,967,313 A | 10/1999 | Gabriel |
| 5,977,196 A | 11/1999 | Wicks |
| 6,013,697 A | 1/2000 | True et al. |
| 6,019,150 A | 2/2000 | Yamagiwa |
| 6,056,852 A * | 5/2000 | Presti et al. ............... 156/394.1 |
| 6,122,810 A | 9/2000 | McInnes |
| 6,158,489 A | 12/2000 | Yamazaki et al. |
| 6,159,403 A | 12/2000 | Yamagiwa |
| 6,186,203 B1 | 2/2001 | Fone |
| 6,267,450 B1 | 7/2001 | Gamble |
| 6,270,602 B1 * | 8/2001 | Johnston et al. ............... 156/92 |
| 6,271,305 B1 | 8/2001 | Rajalingam et al. |
| 6,334,918 B1 | 1/2002 | Yamagiwa et al. |
| 6,345,650 B1 | 2/2002 | Paasch et al. |
| 6,382,469 B1 | 5/2002 | Carter et al. |
| 6,418,991 B1 | 7/2002 | Trice |
| 6,431,225 B1 | 8/2002 | Dudley |
| 6,451,162 B2 | 9/2002 | Yamagiwa |
| 6,454,892 B1 | 9/2002 | Gerresheim et al. |
| 6,492,436 B2 | 12/2002 | Howe et al. |
| 6,500,286 B1 | 12/2002 | Ishikawa et al. |
| 6,502,308 B1 | 1/2003 | Carfora et al. |
| 6,506,273 B1 | 1/2003 | Hull |
| 6,508,898 B1 | 1/2003 | Rustad et al. |
| 6,530,409 B1 | 3/2003 | Ishikawa et al. |
| 6,536,553 B1 | 3/2003 | Scanlon |
| 6,538,060 B2 | 3/2003 | Rajalingam et al. |
| 6,557,603 B1 | 5/2003 | Yamazaki et al. |
| 6,557,604 B2 | 5/2003 | Albrecht |
| 6,568,443 B2 | 5/2003 | Shoner |
| 6,572,592 B1 | 6/2003 | Lopez |
| 6,579,584 B1 | 6/2003 | Compton |
| 6,605,654 B1 | 8/2003 | Fang et al. |
| 6,626,218 B1 | 9/2003 | Ochiai et al. |
| 6,668,875 B2 | 12/2003 | Kojima et al. |
| 6,672,352 B2 | 1/2004 | Yamagiwa et al. |
| 6,708,849 B1 | 3/2004 | Carter et al. |
| 6,726,386 B1 | 4/2004 | Gruenbacher et al. |
| 6,766,834 B1 | 7/2004 | Eckhardt |
| 6,780,904 B2 | 8/2004 | Dudley et al. |
| 6,782,931 B2 | 8/2004 | Koziatek |
| 6,786,364 B2 | 9/2004 | McBride |
| 6,786,990 B1 | 9/2004 | Yamagiwa |
| 6,789,581 B2 | 9/2004 | Cowan et al. |
| 6,806,478 B1 | 10/2004 | Hatfield |
| 6,837,287 B2 | 1/2005 | Smith, Sr. et al. |
| 6,866,735 B2 | 3/2005 | Yamagiwa |
| 6,868,881 B1 | 3/2005 | Yamagiwa |
| 6,889,723 B2 | 5/2005 | Gerresheim et al. |
| 6,911,104 B1 | 6/2005 | Hayashi |
| 6,915,826 B2 | 7/2005 | Poling et al. |
| 6,918,544 B2 | 7/2005 | Ferguson |
| 6,935,391 B2 | 8/2005 | Naito et al. |
| 6,938,651 B1 | 9/2005 | Carter et al. |
| 6,962,181 B2 | 11/2005 | Deevers et al. |
| 6,964,284 B2 | 11/2005 | Eckhardt |
| 6,968,869 B2 | 11/2005 | Eckhardt |
| 6,992,119 B2 | 1/2006 | Kojima et al. |
| 7,004,217 B1 | 2/2006 | Yamagiwa |
| 7,021,848 B1 | 4/2006 | Gruenbacher et al. |
| 7,040,653 B1 | 5/2006 | Breed |
| 7,047,841 B2 | 5/2006 | Ragan et al. |
| 7,073,550 B1 | 7/2006 | Reiter et al. |
| 7,195,683 B2 | 3/2007 | Naito et al. |
| 2001/0007271 A1 | 7/2001 | Rustad et al. |
| 2001/0027246 A1 | 10/2001 | Murayama et al. |
| 2004/0103967 A1 | 6/2004 | Majumdar et al. |
| 2004/0149366 A1 | 8/2004 | Makino et al. |
| 2004/0159386 A1 | 8/2004 | Deevers et al. |
| 2004/0259968 A1 | 12/2004 | Krebs |
| 2005/0034799 A1 | 2/2005 | Serra et al. |
| 2005/0113502 A1 | 5/2005 | Fitzharris Wall et al. |
| 2005/0205186 A1 | 9/2005 | Wall et al. |
| 2005/0215684 A1 | 9/2005 | Fitzharris Wall |
| 2006/0182371 A1 * | 8/2006 | Borchardt ........................ 383/44 |
| 2007/0044883 A1 | 3/2007 | D'Sidocky et al. |
| 2008/0156408 A1 * | 7/2008 | Sekiguchi et al. ............ 152/504 |
| 2008/0264549 A1 | 10/2008 | Shih |

FOREIGN PATENT DOCUMENTS

| | | |
|---|---|---|
| EP | 1424222 A1 | 6/2004 |
| EP | 1435301 A1 | 7/2004 |
| EP | 1437371 A1 | 7/2004 |
| EP | 1533108 A2 | 5/2005 |
| EP | 1533108 A3 | 5/2005 |
| EP | 1580232 A1 | 9/2005 |
| EP | 1714802 A1 | 10/2006 |
| EP | 1942017 A1 | 7/2008 |
| GB | 2146959 A | 5/1985 |
| JP | 5383207 | 7/1978 |
| JP | 53-114882 | * 10/1978 |
| JP | 5311482 | 10/1978 |
| JP | 2004-322811 | * 11/2004 |
| WO | 2006/095862 A1 | 9/2006 |
| WO | WO/2006/095862 | * 9/2006 |
| WO | 2007/049570 A1 | 5/2007 |
| WO | 2008/071361 A1 | 6/2008 |

OTHER PUBLICATIONS

Machine-generated English translation of JP 2004-322811.*
English language translation of JP 53-114882.*
European Patent Office, European Search Report in corresponding EP Application Serial No. 08164764.6-2307, Dec. 22, 2008, 6 pages.
European Patent Office, European Search Report in corresponding EP Application Serial No. 08164602.8-2109, issued Feb. 23, 2009, 4 pages.
Case Corporation, "Tires: Galaxy Tire Program", Aug. 1997, pp. 1-19.
U.S. Patent and Trademark Office, Non-Final Office Action received in related U.S. Appl. No. 11/858,491 dated Jul. 19, 2010, 51 pages.
European Patent Office, European Search Report in corresponding EP Application Serial No. 08164606.9-2307, Dec. 17, 2008, 7 pages.
European Patent Office, European Search Report in corresponding EP Application Serial No. 08165392.5-2425, Nov. 25, 2008, 4 pages.
United States Patent and Trademark Office, Office Action issued in U.S. Appl. No. 11/863,994, dated Nov. 9, 2010. (10 pages).
United States Patent and Trademark Office, Office Action issued in U.S. Appl. No. 11/858,491, dated Dec. 22, 2010. (14 pages).
United States Patent and Trademark Office, Office Action issued in U.S. Appl. No. 11/863,994, dated Apr. 13, 2011. (14 pages).
United States Patent and Trademark Office, Office Action issued in U.S. Appl. No. 11/858,491, dated Apr. 13, 2011. (16 pages).
Gajewski, Vincent, Chemical Degradation of Polyurethane, an article in Rubber World, Sep. 1, 1990, http://www.thefreelibrary.com/Chemical+degradation+of+polyurethane.-a09000712 (5 pages).

United States Patent and Trademark Office, Advisory Action issued in U.S. Appl. No. 11/863,994, dated Jul. 1, 2011. (3 pages).
United States Patent and Trademark Office, Non-Final Office Action issued in U.S. Appl. No. 11/858,491, dated Dec. 6, 2011. (15 pages).
United States Patent and Trademark Office, Advisory Action issued in U.S. Appl. No. 11/858,491, dated Jul. 1, 2011. (3 pages).
United States Patent and Trademark Office, Final Office Action issued in U.S. Appl. No. 11/858,491, dated Apr. 24, 2012. (20 pages).

United States Patent and Trademark Office, Non-Final Office Action issued in U.S. Appl. No. 11/863,994, dated Jul. 19, 2011. (15 pages).
United States Patent and Trademark Office, Final Office Action issued in U.S. Appl. No. 11/863,994, dated Nov. 22, 2011. (20 pages).
United States Patent and Trademark Office, Non-Final Office Action issued in U.S. Appl. No. 11/863,994, dated Apr. 11, 2012. (16 pages).

* cited by examiner

PNEUMATIC TIRE HAVING BUILT-IN SEALANT LAYER AND PREPARATION THEREOF

CROSS-REFERENCE

The present invention is related to U.S. Ser. No. 11/858,491, filed Sep. 20, 2007; U.S. Ser. No. 11/858,990, filed Sep. 21, 2007; and U.S. Ser. No. 11/863,994, filed Sep. 28, 2007, all of which are entitled "Pneumatic Tire Having Built-In Sealant Layer and Preparation Thereof".

FIELD OF THE INVENTION

The present invention is directed to a pneumatic tire having a built-in sealant layer and its preparation.

BACKGROUND OF THE INVENTION

Various methods, sealants and tire constructions have been suggested for pneumatic tires that relate to use of liquid sealant coatings in which the sealant flows into the puncture hole. However, such liquid sealants can flow excessively at elevated temperatures and cause the tire to become out of balance. Also, the liquid sealant may not be entirely operable or effective over a wide temperature range extending from summer to winter conditions. More complicated tire structures which encase a liquid sealant in a vulcanized rubber material can be expensive to manufacture and can also create balance and suspension problems due to the additional weight required in the tire.

Puncture sealing tires also have been further proposed wherein a sealant layer of degradable rubber is assembled into an unvulcanized tire to provide a built-in sealant. The method of construction, however, is generally only reasonably possible when, for example, the sealant layer is laminated with another non-degraded layer of rubber, e.g., a tire inner liner, which permits handling during the tire building procedure. This is because the degradable rubber tends to be tacky or sticky in nature and lacks strength making it very difficult to handle alone without additional support. The inner liner also keeps the sealant layer from sticking to a tire-building apparatus. By laminating the sealant layer between two or more non-degraded rubber layers, e.g., the tire inner liner and a tire carcass, the sealant layer retains structural integrity during the vulcanization operation wherein high pressures are applied to the tire, which would otherwise displace the degraded rubber layer from its desired location. Accordingly, the resulting puncture sealing tire typically has a sealant layer between the inner liner and tire carcass.

Such a lamination procedure significantly increases the cost of manufacturing a tire. In addition, the compounds in the built-in sealant, e.g., organic peroxide depolymerized butyl rubber, may generate gases at higher temperature, such as during cure or during tire use, which can result in aesthetically unappealing inner liner blister formation. Aside from being unappealing, such blister formation may allow the sealant to unfavorably migrate away from its intended location. To combat blister formation, the inner liner, for example, can be provided at an increased thickness but this can add to the cost of building a tire. In addition, increased thickness may undesirably increase heat generation during tire use.

Accordingly, there is a need for a simple and practical method of preparing a self-sealing tire that eliminates or reduces blister formation in the tire inner liner.

SUMMARY OF THE INVENTION

The present invention is directed to a pneumatic tire having a built-in sealant layer and the method of manufacturing such tire.

In one embodiment, a pneumatic tire includes an outer circumferential rubber tread and a supporting carcass. An optional rubber inner liner is disposed inwardly of the supporting carcass. A built-in sealant layer is disposed inwardly from the optional rubber inner liner. The built-in sealant layer provides self-sealing properties to the pneumatic tire. A gas permeable layer is situated adjacent an innermost rubber inner liner and the built-in sealant layer. The innermost rubber inner liner has a plurality of spaced apart openings extending therethrough, which are covered by the gas permeable layer. The tire, with its innermost inner liner with openings and the gas permeable layer, allows for elimination or reduction in blister formation in the tire by permitting gas from the built-in sealant layer to escape or become part of the tire's inflation air, such as when the tire is at its running temperature.

The pneumatic tire, in one embodiment, can be prepared by positioning an innermost rubber inner liner on a tire-building apparatus. The innermost rubber inner liner is provided with a plurality of spaced apart openings extending therethrough. Next, a gas permeable layer is positioned directly on the innermost rubber inner liner to cover the openings followed by a precursor sealant layer directly on the gas permeable layer. An optional rubber inner liner is disposed outwardly of the precursor sealant layer followed by a tire carcass then a rubber tire tread on the tire carcass to define an unvulcanized tire assembly. The unvulcanized tire assembly can be vulcanized under conditions of heat and pressure such that the precursor sealant layer provides the pneumatic tire with a built-in sealant layer with self-sealing properties.

In another embodiment, a method of preparing a pneumatic tire includes positioning an innermost rubber inner liner on a tire-building apparatus. The innermost rubber inner liner has a plurality of spaced apart openings extending therethrough. Next, a non-woven sheet of a polymeric material is positioned on the innermost rubber inner liner to cover the openings followed by a precursor sealant layer directly on the non-woven sheet. The precursor sealant layer includes an uncured butyl rubber-based rubber composition or a polyurethane based composition. A rubber inner liner, without openings, is disposed outwardly of the precursor sealant layer followed by a tire carcass then a rubber tire tread on the tire carcass to define an unvulcanized tire assembly. The unvulcanized tire assembly can be vulcanized under conditions of heat and pressure such that the precursor sealant layer provides the pneumatic tire with a built-in sealant layer with self-sealing properties.

By virtue of the foregoing, there is provided a pneumatic tire that has an ability to seal against various puncturing objects and can eliminate or reduce inner liner blister formation in the tire, for example.

BRIEF DESCRIPTION OF THE DRAWINGS

The accompanying drawings, which are incorporated in and constitute a part of this specification, illustrate embodiments of the invention and, together with the general description of the invention given above, and detailed description given below, serve to explain the invention.

DETAILED DESCRIPTION

Figure 1:
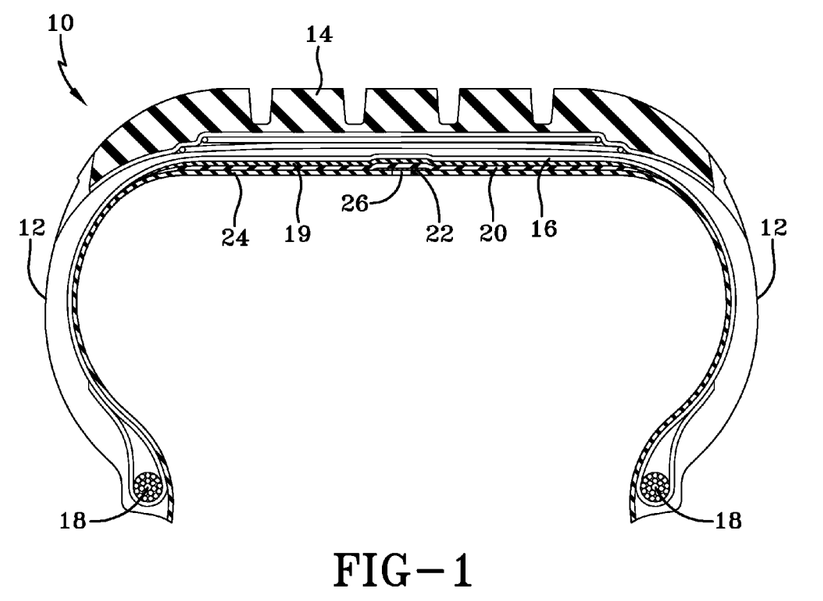
FIG. 1 is a cross-sectional view of a pneumatic tire in accordance with one embodiment of the present invention.

FIG. 1 shows a pneumatic tire 10 that has an ability to seal against various puncturing objects and has the ability to eliminate or reduce blister formation in the tire 10, particularly inner liner blister formation. The tire 10 includes sidewalls 12, an outer circumferential rubber tread (or tread portion) 14, a supporting carcass 16, inextensible beads 18, an optional rubber inner liner (or air barrier layer) 19, a built-in sealant layer 20, a gas permeable layer 22, and an innermost rubber inner liner 24.

The individual sidewalls 12 extend radially inward from the axial outer edges of the tread portion 14 to join the respective inextensible beads 18. The supporting carcass 16 acts as a supporting structure for the tread portion 14 and sidewalls 12. The optional rubber inner liner 19 is disposed inwardly from the supporting carcass 16. The built-in sealant layer 20 is disposed inwardly from the optional rubber inner liner 19. The gas permeable layer 22 is adjacent the built-in sealant layer 20 and the innermost rubber inner liner 24. The innermost rubber inner liner 24 has a plurality of spaced apart openings 26 extending therethrough, which are covered by the gas permeable layer 22. The outer circumferential tread 14 is adapted to be ground contacting when the tire 10 is in use. The tire 10, with its innermost inner liner 24 with openings 26 and gas permeable layer 22, allows for elimination or reduction in blister formation in the tire by permitting gases from the built-in sealant layer 20 to escape or become part of the tire's inflation air, such as when the tire 10 is at its running temperature.

The innermost rubber tire inner liner 24 may be any known rubber inner liner for use in pneumatic tires 10, which is processed to provide the plurality of spaced-apart openings 26 which extend therethrough. In one example, the innermost rubber inner liner 24 can be a non-butyl general purpose rubber (GPR). In another example, the innermost rubber inner liner 24 can be a sulfur curative-containing halobutyl rubber composition of a halobutyl rubber such as for example chlorobutyl rubber or bromobutyl rubber. Such halobutyl rubber based inner liner layer may also contain one or more sulfur curable diene-based elastomers such as, for example, cis 1,4-polyisoprene natural rubber, cis 1,4-polybutadiene rubber and styrene/butadiene rubber, or mixtures thereof.

The innermost rubber inner liner 24 is normally prepared by conventional calendering or milling techniques to form a strip of uncured compounded rubber of appropriate width. The openings 26 in the innermost rubber inner liner 24 may be provided by periodic dying out at the calendaring step, which can be followed by covering the openings 26 of the innermost rubber inner liner 24 with a continuous roll of gas permeable layer 22. Although, not shown, it is contemplated that the gas permeable layer 22 may be discontinuous such that pieces of the gas permeable layer 22 are positioned to cover each opening 26. In one example, the openings 26 are generally situated about the center, or equatorial plane, of the tire 10. The number of openings 26 may vary from tire to tire. In one example, four openings 26 can be spaced evenly about the innermost rubber inner liner 24 of the tire 10. When the tire 10 is cured, the innermost rubber inner liner 24 becomes an integral, co-cured, part of the tire 10.

The openings 26 in the innermost rubber inner liner 24 include a maximum dimension of no greater than about 50 mm and a minimum dimension no less than about 5 mm. In another embodiment, the openings 26 may include a maximum dimension of no greater than about 40 mm and a minimum dimension no less than about 20 mm. The openings 26 may be symmetrical and/or asymmetrical and may be evenly or unevenly spaced apart. In one embodiment, the dimensions of the openings 26 may be variable. Such openings, as indicated above, permits gases from the built-in sealant layer 20 to escape or become part of the tire's inflation air.

The gas permeable layer 22 of the tire 10 defines a non-woven sheet of polymeric material. In one example, the gas permeable layer 22 includes a non-woven sheet of polyester, nylon, or aramid. The non-woven sheet may be prepared by a melt blown, spun bond, or point bonding process, as is known in the art. Such polyester and nylon non-woven sheets, for example, are available from Nolar Industries Limited of Ontario, Canada. The gas permeable layer 22 covers the openings 26 and helps prevent the sealant material from pushing through the openings 26 while also permitting gases from the built-in sealant layer 20 to pass therethrough and out the openings 26.

The built-in sealant layer 20, prior to vulcanization of the pneumatic tire 10, is referred to herein as a precursor sealant layer 25. The precursor sealant layer 25 can generally include any non-flowing sealant material known in the art.

In one embodiment, the precursor sealant layer 25 can include a self-healing polyurethane composition. In one example, such polyurethane composition may define a non-flowing, or non-liquid, polyurethane composition that is neither gel-like nor substantially tacky and that provides a self-supporting precursor sealant layer 25. Concerning self-supporting, the polyurethane composition of the precursor sealant layer 25 maintains its own form, e.g., as a sheet or layer, without the need to be laminated to one or more supporting structures. The polyurethane composition is substantially non-tacky in that a sheet of the polyurethane composition, for example, may contact another sheet yet be pulled apart with relative ease and still substantially maintain its original form. The non-flowing polyurethane composition can include a self-healing polyurethane elastomeric material, which may contain, for example, methylene diphenyl 4,4'-diisocyanate (MDI) and poly(alkylene oxide) glycol. Such polyurethane composition for use as the precursor sealant layer 25 may be obtained from Novex of Wadsworth, Ohio. In another example, the self-healing polyurethane composition is gel-like and tacky. One such suitable polyurethane composition is Tyrlyner® available from VITA Industrial Inc. of Thomasville, Ga. It should be understood that formulations of urethane materials that can be used for the self-healing polyurethane composition may be readily produced by persons having ordinary skill in the art from known chemistry techniques in the production of urethanes.

After vulcanization, the polyurethane composition provides a gel-like and tacky polyurethane composition, such as by way of thermal degradation, which provides the pneumatic tire 10 with self-sealing properties and defines the built-in sealant layer 20.

In another example, the precursor sealant layer 25 can include an uncured butyl rubber-based rubber composition. One such suitable uncured butyl rubber-based rubber composition is disclosed in U.S. Pat. No. 6,962,181 which is expressly incorporated by reference herein in its entirety.

In one embodiment, the uncured butyl rubber-based rubber composition may include a peroxide and a dispersion therein of a particulate precured rubber selected from the resin-cured butyl rubber. In one example, based upon parts by weight per 100 parts by weight of said butyl rubber, the butyl rubber-based rubber composition can include a copolymer of isobutylene and isoprene, wherein the copolymer contains from about 0.5 units to about 5 units derived from isoprene, and correspondingly from about 95 weight percent to about 99.5 weight percent units derived from isobutylene. The butyl rubber that can be employed may typically have a number average molecular weight, for example, in the range of 200,000 to 500,000. Such butyl rubber and its preparation is well known to those having skill in such art.

The uncured butyl rubber composition further includes a sufficient amount of organoperoxide to cause the butyl rubber to partially depolymerize, usually in a range of from about 0.5 to about 10 phr of the active organoperoxide depending somewhat upon the time and temperature of the tire curing operation and the degree of depolymerization desired.

Various organoperoxides may be used such as those that become active (e.g. generate peroxide free radicals) at high temperatures, that is, above about 100° C. Such organoperoxides are referred to herein as active peroxides. Examples of such organoperoxides are, for example, tertbutyl perbenzoate and dialkyl peroxides with the same or different radicals, such as dialkylbenzene peroxides and alkyl pre-esters. In one example, the active organoperoxide will contain two peroxide groups. In another example, the peroxide groups are attached to a tertiary butyl group. The basic moiety on which the two peroxide groups are suspended can be aliphatic, cycloaliphatic, or aromatic radicals. Some representative examples of such active organoperoxides are, for example, 2,5-bis(t-butyl peroxy)-2,5-dimethyl hexane; 1,1-di-t-butyl peroxi-3,3,5-trimethyl cyclohexane; 2,5-dimethyl-2,5-di(t-butyl peroxy)hexyne-3; p-chlorobenzyl peroxide; 2,4-dichlorobenzyl peroxide; 2,2-bis-(t-butyl peroxi)-butane; di-t-butyl peroxide; benzyl peroxide; 2,5-bis(t-butyl peroxy)-2,5-dimethyl hexane, dicumyl peroxide; and 2,5-dimethyl-2,5-di(t-butyl peroxy)hexane. Other suitable organoperoxides may be found in P. R. Dluzneski, "Peroxide vulcanization of elastomers", Rubber Chemistry and Technology, Vol. 74, 451 (2001), which is expressly incorporated by reference herein in its entirety.

The peroxide can be added to the uncured butyl rubber composition in pure form (100 percent active peroxide) or on an inert, free-flowing mineral carrier. Silicon oil is an inert mineral carrier often utilized for this purpose. Such carrier composition containing from about 35 weight percent to 60 weight percent active ingredient (peroxide) can be employed. For example, 40 percent by weight dicumylperoxide on an inert carrier can be employed as the peroxide vulcanizing agent in the butyl rubber composition layer.

The uncured butyl rubber-based rubber composition may further include particulate filler including about 5 phr to about 90 phr of at least one of rubber reinforcing carbon black and coal dust, or mixtures thereof, and, optionally from zero phr to 6 phr of short fibers, and/or from zero phr to about 20 phr of hollow glass microspheres. It is also to be understood that other known fillers and/or reinforcing agents, such as silica and calcium carbonate, can be substituted for part of the carbon black in this composition.

For the carbon black, various particulate rubber reinforcing carbon blacks are, for example, carbon black referenced in The Vanderbilt Rubber Handbook, 1978, Pages 408 through 417, which are characterized by iodine adsorption (ASTM D510) and dibutylphthalate absorption (ASTM D 2414) values which are prepared by deposition from a vapor phase at very high temperatures as a result of thermal decomposition of hydrocarbons, rather than a carbonization of organic substances. Such carbon black may have an Iodine adsorption value ranging from 20 mg/g to 270 mg/g and a dibutylphthalate absorption value ranging from 60 cc/100 gms to 180 cc/100 gms. Such carbon black is composed of aggregates of elemental carbon particles of colloidal dimensions, which have a high surface area.

Coal dust, or coal fines, is carbonaceous dust from naturally occurring coal. Coal dust is of significantly greater size than rubber reinforcing carbon black, is not rubber reinforcing in the sense of rubber reinforcing carbon black, and represents a significantly lower cost filler than rubber reinforcing carbon black. The coal dust can be used in greater quantities (concentration) in the butyl rubber composition without significantly adversely affecting the processing of the composition, yet being beneficial to aid in the efficiency of the puncture sealing ability of the resultant built-in sealant layer 20. Further, the coal dust is considered herein useful in promoting adjustment of the storage modulus ($G'$) property of the sealant.

The short fibers may be selected from, for example, cotton fibers and from synthetic fibers selected from rayon, aramid, nylon and polyester fibers, or mixtures thereof. Such cotton short fibers may have an average length, for example, in a range of up to about 200 microns (e.g. an average length of about 150 microns) and the synthetic (e.g. the polyester and nylon fibers) may have an average length, for example, of up to a maximum of about 2,500 microns. The short fibers are considered herein to promote adjustment of a $G'$ property of the sealant composition as well as, in relatively low concentrations, not significantly interfering with the processing of the sealant precursor composition and enhancing the efficiency of the resultant built-in sealant layer 20 and its puncture sealing ability.

Representative of the hollow glass microspheres are, for example, Scotchlite Glass Bubbles™ (S60/10000 series), having an average spherical diameter of about 30 microns, from the 3M Company. The hollow glass microspheres are considered herein to promote adjustment of a $G'$ property of the sealant composition as well as enhancing the puncture sealing efficiency and capability of the built-in sealant and, in relatively low concentrations, not significantly adversely affecting the processing of the sealant precursor composition.

The uncured butyl rubber-based rubber composition may further include from zero phr to about 20 phr of rubber processing oil, such as one having a maximum aromatic content of about 15 weight percent with a naphthenic content in a range of from about 35 weight percent to about 45 weight percent and a paraffinic content in a range of about 45 weight percent to about 55 weight percent.

The various rubber processing oils are known to those having skill in such art. In one example, the rubber processing oil has a low aromaticity content, such as less than about 15 weight percent. Such a rubber processing oil may be composed of, for example, about 35 weight percent to about 45 weight percent naphthenic content, about 45 weight percent to about 55 weight percent paraffinic content, and an aromatic content of less than about 15 weight percent (e.g. from about 10 to about 14 weight percent). It is considered herein that a representative of such rubber processing oil is Flexon 641™ from the ExxonMobil company.

The uncured butyl rubber-based rubber composition may further include from zero phr to about 10 phr of liquid conjugated diene-based polymer having a weight average molecular weight of less than 80,000 provided however, where the particulate filler is exclusively rubber reinforcing carbon black, the partial composition contains at least 1 phr of liquid diene-based polymer.

The liquid conjugated diene-based liquid polymer may be, for example, a liquid cis 1,4-polyisoprene polymer and/or liquid cis 1,4-polybutadiene polymer. It is to be appreciated that such liquid polymers for the butyl rubber precursor composition are therefore polymers that contain olefinic unsaturation and therefore are not intended to include polyisobutylene that does not contain olefinic unsaturation. A commercial liquid cis 1,4-polyisoprene polymer may be, for example, LIR 50™ from the Kuraray Company of Osaki, Japan. A liquid cis 1,4-polybutadiene polymer (absorbed on a particulate filler) may be, for example, Karasol PS-01™ from the Drobny Polymer Association.

It is considered herein that the liquid polyisoprene polymer in the butyl rubber acts to aid in regulating the storage modulus G' of the partially depolymerized butyl rubber. For example, addition of the liquid polyisoprene polymer has been observed to provide the partially depolymerized butyl rubber composition with a somewhat increased loss modulus G' which may be desirable for some applications.

In one example, the uncured butyl based composition can include 100 parts of a butyl rubber copolymer, about 10 to 40 parts of carbon black, about 5 to 35 parts of polyisobutylene, about 5 to 35 parts of an oil extender, about 0 to 1 part of sulfur, and from about 1 to 8 parts of a peroxide vulcanizing agent.

The polyurethane compositions for use in the sealant layer 20 (and precursor sealant layer 25) may further include one or more of the additional components as discussed above, such as reinforcing filler, e.g., carbon black, silica, coal dust, fibers, microspheres, processing oil, etc. It should be understood by one having ordinary skill in the art that additional components may be included in the sealant layer 20 as desired, such as antidegradants, accelerators, etc., in conventional amounts.

The built-in sealant layer 20 (and precursor sealant layer 25) may further include a colorant to provide a non-black colored built-in sealant layer having the capability of visibly identifying a puncture wound. That puncture wound may extend through a black colored rubber inner liner layer, black colored rubber tire tread, and/or black colored sidewall layer to the built-in sealant layer by a physical flow of a portion of the non-black colored built-in sealant layer through the puncture wound to form a contrastingly non-black colored sealant on a visible surface of the black colored inner liner, tread, or sidewall.

The colorant may include titanium dioxide. For example, the colorant of the sealant layer 20 may be titanium dioxide where a white colored sealant layer is desired. Also, such colorant may include titanium dioxide as a color brightener together with at least one non-black organic pigment and/or non-black inorganic pigment or dye. Various colorants may be used to provide a non-black color to the sealant layer 20. Representative of such colorants are, for example, yellow colored colorants as Diarylide Yellow™ pigment from PolyOne Corporation and Akrosperse E-6837™ yellow EPMB pigment masterbatch with an EPR (ethylene/propylene rubber) from the Akrochem Company.

The various components of the precursor sealant layer 25, prior to building the tire 10, can be mixed together using conventional rubber mixing equipment, particularly an internal rubber mixer. The butyl rubber and polyurethane composition used in the sealant layer 20 generally has sufficient viscosity and enough unvulcanized tack to enable its incorporation into an unvulcanized tire without substantially departing from standard tire building techniques and without the use of complicated, expensive tire building equipment.

Material permitting, the precursor sealant layer 25, prior to building of the tire 10, may be formed into sheet stock that can be cut into strips and then positioned on a tire building apparatus 30, such as a tire drum, during the tire build-up process. The tire building process is described in detail further below.

The optional rubber tire inner liner 19 may be any known rubber inner liner for use in pneumatic tires 10. In one example, the rubber inner liner 19 can be a non-butyl general purpose rubber (GPR). In another example, the rubber inner liner 19 can be a sulfur curative-containing halobutyl rubber composition of a halobutyl rubber such as for example chlorobutyl rubber or bromobutyl rubber. Such tire halobutyl rubber based inner liner layer may also contain one or more sulfur curable diene-based elastomers such as, for example, cis 1,4-polyisoprene natural rubber, cis 1,4-polybutadiene rubber and styrene/butadiene rubber, or mixtures thereof. In contrast to innermost rubber inner liner 24, rubber inner liner (or air barrier layer) 19 is free from openings 26. Rubber inner liner 19 is normally prepared by conventional calendering or milling techniques such as to form a strip of uncured compounded rubber of appropriate width. When the tire 10 is cured, the rubber inner liner 19 becomes an integral, co-cured, part of the tire 10. Tire inner liners, like that of rubber inner liner 19, and their methods of preparation are well known to those having skill in such art.

The tire carcass 16 generally may be any conventional tire carcass for use in pneumatic tires 10. Generally, the tire carcass 16 includes one or more layers of plies and/or cords to act as a supporting structure for the tread portion 14 and sidewalls 12. The remainder of the tire components, e.g., tire tread 14, sidewalls 12, and reinforcing beads 18, also generally may be selected from those conventionally known in the art. The tire carcass 16, tire tread 14, and beads 18 and their methods of preparation are well known to those having skill in such art.

Figure 2:
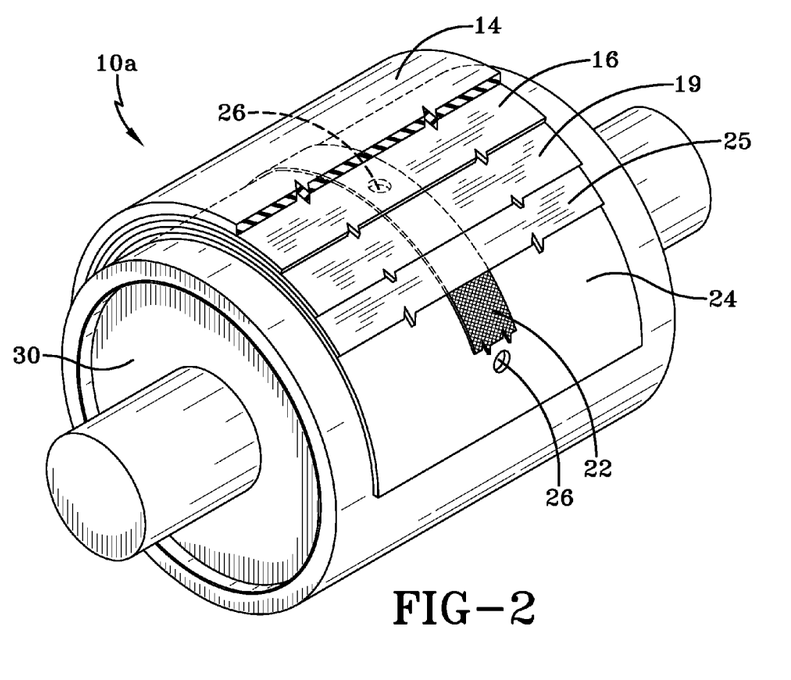
FIG. 2 is a perspective view partially broken away of an unvulcanized tire assembly prepared in accordance with one embodiment of the present invention.

The pneumatic tire of FIG. 1 may be prepared, as best shown in FIG. 2, by building sealant layer 20 into an uncured tire 10a using tire drum 30 and conventional tire building techniques. More specifically, the innermost rubber inner liner 24, which includes the plurality of spaced apart openings 26, is first situated or positioned on the tire drum 30, such as by being wrapped therearound, with the remainder of the uncured tire 10a being subsequently built thereon. The thickness of the innermost rubber inner liner 24 can vary in the unvulcanized tire 10a. Generally, the thickness may range from about 0.1 cm (0.04 inches) to about 0.5 cm (0.20 inches).

With continuing reference to FIG. 2, the gas permeable layer 22, which may include a non-woven sheet of polymeric material, is positioned directly on the innermost rubber inner liner 24. The precursor sealant layer 25 is then positioned on the gas permeable layer 22. For example, the butyl rubber based rubber or polyurethane composition can be formed into a strip or layer of unvulcanized rubber, by using conventional equipment such as a calender, extruder, or any combination thereof. The thickness of the strip can vary in the unvulcanized tire. Generally, the thickness may range from about 0.13 cm (0.05 inches) to about 1.9 cm (0.75 inches). In passenger tires, the precursor sealant layer 25 may have a thickness of about 0.32 cm (0.125 inches) whereas for truck tires, the precursor sealant layer 25 may have a thickness of about 0.76 cm (0.3 inches). The built-in sealant layer 20 is generally situated in the crown region of the tire 10, and may include colorant so that it is of a non-black color that may contrast with the black colored inner liner, tread, or sidewall so that a tire puncture can be noticed.

Finally, optional rubber inner liner 19, is situated, or disposed outwardly, of the precursor sealant layer 25 followed by the tire carcass 16 then the rubber tire tread 14, which is positioned on the tire carcass 16, thereby defining unvulcanized tire assembly 10a.

After the unvulcanized pneumatic tire 10a is assembled, the tire 10a is shaped and cured using a normal tire cure cycle.

After curing, the composition of the precursor sealant layer 25 is gel-like and tacky which provides the pneumatic tire 10 with self-sealing properties and defines the built-in sealant layer 20.

Generally, the tire 10a can be cured over a wide temperature range. For example, passenger tires might be cured at a temperature ranging from about 130° C. to about 170° C. and truck tires might be cured at a temperature ranging from about 150° C. to about 180° C. Thus, a cure temperature may range, for example, from about 130° C. to about 180° C. and for a desired period of time. In one example, the tire assembly 10a is cured in a suitable mold at a temperature in a range of from about 150° C. to about 175° C. for a sufficient period of time to partially depolymerize the butyl rubber or thermally degrade non-flowing polyurethane that is neither gel-like nor substantially tacky, for example, thereby forming the built-in sealant layer 20 which has puncture sealing properties. After curing, the gas permeable layer 22 is securely attached to the built-in sealant 20.

Non-limiting examples of test pieces of the pneumatic tire 10 with built-in sealant 20 in accordance with the detailed description are now disclosed below. These examples are merely for the purpose of illustration and are not to be regarded as limiting the scope of the invention or the manner in which it can be practiced. Other examples will be appreciated by a person having ordinary skill in the art.

Three pneumatic tire test pieces were prepared for testing. Each test piece is described below.

Test Piece No. 1
The following layers were assembled one on top of the other:
3"×3" inner liner compound of thickness 0.03"
1" diameter yellow butyl based precursor sealant layer of thickness 0.25"
Circular non-woven polyester (2 oz./sq. yard) of 0.5" diameter covering the central opening
3"×3" inner liner compound of thickness 0.03" with a central opening therethrough of 0.25" diameter
The above laminated test piece was cured for 35 minutes at 150° C. and 200 psi in a bladder mold, which showed no contamination of yellow sealant layer after cure inspection.

Test Piece No. 2
The following layers were assembled one on top of the other:
3"×3" inner liner compound of thickness 0.03"
1" diameter yellow butyl based precursor sealant layer of thickness 0.25"
Circular non-woven nylon (2 oz./sq. yard) of 0.5" diameter covering the central opening
3"×3" inner liner compound of thickness 0.03" with a central opening therethrough of 0.25" diameter
The above laminated test piece was cured for 35 minutes at 150° C. and 200 psi in a bladder mold, which showed no contamination of yellow sealant layer after cure inspection.

Test Piece No. 3
The following layers were assembled one on top of the other:
7"×7" calendared tread of thickness 0.1"
4"×4" calendared wire of thickness 0.068"
7"×7" belt (aligned with the wire) of thickness 0.026"
3"×3" butyl based precursor sealant layer of thickness 0.25"
3"×3" higher permeable, non-butyl general purpose rubber (GPR) liner of thickness 0.038"
The above laminated test piece was cured for 35 minutes at 150° C. and 200 psi in a bladder mold.

Test Piece No. 4
The following layers were assembled one on top of the other:
7"×7" calendared tread of thickness 0.1"
4"×4" calendared wire of thickness 0.068"
7"×7" belt (aligned with the wire) of thickness 0.026"
3"×3" yellow butyl based precursor sealant layer of thickness 0.25"
2" diameter non-woven polyester (1 oz./sq. yard)
7"×7" calendared inner liner compound of thickness 0.03" with a central opening therethrough of 1" diameter, with non-woven sheet covering the central opening
The above laminated test piece was cured for 35 minutes at 150° C. and 200 psi in a bladder mold, which showed no contamination of yellow sealant layer after cure inspection as its migration was blocked by the non-woven.

Test Piece No. 5
The following layers were assembled one on top of the other:
7"×7" calendared tread of thickness 0.1"
4"×4" calendared wire of thickness 0.068"
7"×7" belt (aligned with the wire) of thickness 0.026"
3"×3" polyurethane based precursor sealant layer of thickness 0.125" obtained from Novex of Wadsworth, Ohio
2" diameter non-woven polyester (2 oz./sq. yard)
7"×7" calendared inner liner compound of thickness 0.03" with a central opening therethrough of 1" diameter, with non-woven sheet covering the central opening
The above laminated test piece was cured for 35 minutes at 150° C. and 200 psi in a bladder mold, which showed no contamination of yellow sealant layer after cure inspection as its migration was blocked by the non-woven.

Control Test Piece No. 1
The following layers were assembled one on top of the other:
3"×3" inner liner compound of thickness 0.03"
1" diameter yellow butyl based precursor sealant layer of thickness 0.25"
3"×3" inner liner compound of thickness 0.03"
The above laminated test piece was cured for 35 minutes at 150° C. and 200 psi in a bladder mold.

Control Test Piece No. 2
The following layers were assembled one on top of the other:
7"×7" calendared tread of thickness 0.1"
4"×4" calendared wire of thickness 0.068"
7"×7" belt (aligned with the wire) of thickness 0.026"
3"×3" butyl based precursor sealant layer of thickness 0.25"
7"×7" calendared inner liner compound of thickness 0.03"
The above laminated test piece was cured for 35 minutes at 150° C. and 200 psi in a bladder mold.

The non-woven sheets were obtained from Nolar Industries Limited of Ontario, Canada. The butyl based composition used for the precursor sealant layer is set forth below in Table I. The composition was prepared in a two-step process with the butyl rubber and the specified ingredients being mixed in a first non-productive step. In a second step, peroxide was mixed into the butyl rubber mixture.

TABLE I

Composition of Butyl Based Sealant

| Component | Stage | Amount (phr) |
|---|---|---|
| Butyl rubber | Non-productive 1 (NP1) | 100.00 |
| Medium processing oil | NP1 | 3.00 |
| Silica | NP1 | 20.00 |
| Clay | NP1 | 10.00 |
| Titanium dioxide | NP1 | 2.0 |
| Dusting agent | NP1 | 0.5 |

TABLE I-continued

Composition of Butyl Based Sealant

| Component | Stage | Amount (phr) |
|---|---|---|
| Yellow pigment[1] | NP1 | 1.00 |
| NP1 | Productive | 136.5 |
| Peroxide[2] (40%) | Productive | 12.00 |
| Total | | 148.50 |

[1]Yellow pigment, Akrochem E-6837
[2]Link-Cup ® NBV40C available from GEO Specialty Chemicals of Gibbstown, NJ; chemical name: n-butyl-4,4-di(tert-butylperoxy)valerate, 40% supported on calcium carbonate Each test piece was placed in an oven at 150° C. for 15 minutes to test for blister formation. After that period, the test pieces were removed from the oven and visually observed. Blister formation was not detected in test piece nos. 1, 2, 4 or 5. This suggested that the non-woven material permitted volatile material formed from thermal degradation of the butyl rubber based sealant to escape therethrough and out the central opening thus preventing blister formation. In contrast, test piece no. 3 and control test piece nos. 1 and 2 showed heavy blister formation in the inner liner.

Cured control test piece no. 2 and cured test piece nos. 4 and 5 were further tested to evaluate puncture sealing effectiveness of different sealant materials, e.g., a butyl based sealant composition and a polyurethane based sealant composition.

In the testing process, each test piece was secured lengthwise across an open chamber of a box, which defined a benchtop nail hole tester, to generally seal the opening to the chamber. The test pieces were situated so that the inner liner faced the open chamber and the tire tread faced outwardly. In the chamber, air pressure could be established via an inlet valve, maintained, and monitored to simulate a pressurized pneumatic tire. A nail was used to manually puncture the test piece. Each test piece was subjected to puncturing by nails of varying and increasing diameter to evaluate air pressure loss after nail insertion, removal, and reinflation (if needed). Air pressure readings at each step were taken after a two-minute period. The results of the puncture sealing testing are set out in Table II below.

TABLE II

Test Results

| | Test Piece no. 4 | Test Piece no. 5 | Control |
|---|---|---|---|
| Initial psi = 35 | 35 | 35 | 35 |
| After 0.136" diameter nail insertion | | | |
| After nail removal | 31 | 35 | 15 |
| Re-inflation to 35 psi | 35 | Not Needed | 35 |
| Initial psi = 35 | 35 | 35 | 35 |
| After 0.176" diameter nail insertion | | | |
| After nail removal | 13 | 35 | 8 |
| Re-inflation to 35 psi | 35 | Not Needed | 35 |
| Initial psi = 35 | 35 | 35 | 35 |
| After 0.235" diameter nail insertion | | | |
| After nail removal | 0 | 35 | 0 |
| Re-inflation to 35 psi | Leak from nail hole | Not Needed | Leak from nail hole |

The test results showed that test piece no. 4 and control test piece no. 2 could seal nail holes up to 0.176" in diameter by maintaining air pressure after reinflation to the initial starting air pressure. This indicates that the non-woven material did not adversely affect nail hole sealing capabilities. Test piece no. 5, which utilized the thermally degradable polyurethane composition, could seal nail holes up to at least 0.235" in diameter by maintaining initial air pressure after nail removal. In other words, reinflation of test piece no. 5 was not required.

Accordingly, there is provided a pneumatic tire 10 that has an ability to seal against various puncturing objects and can eliminate or reduce inner liner blister formation in the tire 10.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A pneumatic tire with built-in sealant layer comprising: an outer circumferential rubber tread, a supporting carcass therefore, an optional rubber inner liner disposed inwardly from the supporting carcass, a built-in sealant layer disposed inwardly from the supporting carcass and, if the optional rubber inner liner is present, inwardly from the optional rubber inner liner as well, an innermost rubber inner liner disposed inwardly from the built-in sealant layer and having a plurality of spaced apart openings extending therethrough with each opening defining an open width, and a gas permeable sheet situated between the built-in sealant layer and the innermost rubber inner liner to cover the openings, wherein the built-in sealant layer provides self-sealing properties to the pneumatic tire.

2. The tire of claim 1 wherein the openings have a maximum dimension of no greater than about 50 mm and a minimum dimension no less than about 5 mm.

3. The tire of claim 1 wherein the gas permeable sheet is a non-woven sheet of polymeric material.

4. The tire of claim 3 wherein the polymeric material includes a polyester, nylon, or aramid.

5. The tire of claim 1 wherein the precursor sealant layer comprises a butyl rubber-based rubber composition.

6. The tire of claim 1 wherein the precursor sealant layer comprises a polyurethane based composition.

7. The tire of claim 1 wherein the innermost rubber inner liner is a non-butyl general purpose rubber.

8. A pneumatic tire prepared according to a method comprising:
positioning an innermost rubber inner liner on a tire-building apparatus, the innermost rubber inner liner having a plurality of spaced apart openings extending therethrough with each opening defining and open width;
positioning a gas permeable sheet on the innermost rubber inner liner to cover the openings followed by a precursor sealant layer directly on the gas permeable sheet;
disposing outwardly of the precursor sealant layer, a tire carcass then a rubber tire tread on the tire carcass to define an unvulcanized tire assembly, an optional second rubber inner liner being disposed between the carcass and the precursor sealant layer; and
vulcanizing the unvulcanized tire assembly under conditions of heat and pressure such that the precursor sealant layer is changed by the heat to provide the pneumatic tire with a built-in sealant layer with self-sealing properties.

9. A pneumatic tire prepared according to a method comprising:

positioning an innermost rubber inner liner on a tire-building apparatus, the innermost rubber inner liner having a plurality of spaced apart openings extending therethrough with each opening defining and open width;

positioning a non-woven gas permeable sheet of a polymeric material on the innermost rubber inner liner to cover the openings followed by a precursor sealant layer directly on the non-woven gas permeable sheet, the precursor sealant layer comprising an uncured butyl rubber-based rubber composition or a polyurethane based composition;

disposing outwardly of the precursor sealant layer, a rubber inner liner without openings followed by a tire carcass then a rubber tire tread on the tire carcass to defined an unvulcanized tire assembly; and vulcanizing the unvulcanized tire assembly under conditions of heat and pressure to provide the pneumatic tire such that the precursor sealant layer is changed by the heat to provide the pneumatic tire with a built-in sealant layer with self-sealing properties.

* * * * *

UNITED STATES PATENT AND TRADEMARK OFFICE
CERTIFICATE OF CORRECTION

PATENT NO. : 8,316,903 B2
APPLICATION NO. : 11/865167
DATED : November 27, 2012
INVENTOR(S) : Ramendra Nath Majumdar et al.

It is certified that error appears in the above-identified patent and that said Letters Patent is hereby corrected as shown below:

Colum 12, Line 57, Claim 8, "... with each opening defining and open width;" should read
-- ... with each opening defining an open width; --

Column 13, Line 8, Claim 9, "... with each opening defining and open width;" should read
-- ... with each opening defining an open width; --

Column 14, Line 6, Claim 9, "... on the tire carcass to defined an ..." should read
-- ... on the tire carcass to define an ... --

Signed and Sealed this
Fifth Day of March, 2013

Teresa Stanek Rea
*Acting Director of the United States Patent and Trademark Office*